United States Patent
Seppinen et al.

(10) Patent No.: US 7,453,934 B2
(45) Date of Patent: Nov. 18, 2008

(54) AUTOMATIC RECEIVER CALIBRATION WITH NOISE AND FAST FOURIER TRANSFORM

(75) Inventors: Pauli Seppinen, Essen (DE); Julius Koskela, Helsinki (FI); Mikael Gustafsson, Porvoo (FI)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 11/169,284

(22) Filed: Jun. 27, 2005

(65) Prior Publication Data

US 2006/0291549 A1 Dec. 28, 2006

(51) Int. Cl.
*H04B 17/00* (2006.01)
(52) U.S. Cl. .................................. 375/227; 455/114.2
(58) Field of Classification Search ................. 375/260, 375/277–278, 285, 296, 316–317, 324, 345; 455/63.1, 67.13, 232.1, 234.1, 245.1, 114.2
See application file for complete search history.

(56) References Cited

U.S. PATENT DOCUMENTS

| | | | |
|---|---|---|---|
| 5,675,581 A * | 10/1997 | Soliman | 370/252 |
| 6,198,781 B1 * | 3/2001 | Ohno et al. | 375/322 |
| 6,636,722 B1 * | 10/2003 | Dalebroux et al. | 455/67.11 |
| 7,158,586 B2 * | 1/2007 | Husted | 375/324 |
| 7,165,000 B2 * | 1/2007 | Ashley et al. | 702/107 |
| 7,170,961 B2 * | 1/2007 | Vandenameele-Lepla | 375/371 |
| 7,245,893 B1 * | 7/2007 | Husted et al. | 455/226.3 |
| 2003/0176174 A1 | 9/2003 | Seppinen et al. | |
| 2003/0206603 A1 | 11/2003 | Husted | |
| 2004/0082300 A1 | 4/2004 | Scheck | |
| 2004/0137870 A1 | 7/2004 | Kivekas et al. | |
| 2004/0242177 A1 * | 12/2004 | Yang | 455/234.1 |

FOREIGN PATENT DOCUMENTS

WO   WO 02/25804 A2   3/2002

OTHER PUBLICATIONS

A CMOS Frequency Synthesizer with and Injection-Locked Frequency Divider for a 5-GHz Wireless LAN Receiver, Hamid R. Rategh, Hirad Samavati and Thomas H. Lee, IBEE Journal on Solid State Circuits, vol. 35, No. 5, May 2000.
A 1.9 GHz Silicon Receiver with Monolithic Image Filtering, Jose A. Macedo, IEEE Journal of Solid State Circuits, vol. 33, No. 3, Mar. 1998.

* cited by examiner

*Primary Examiner*—Khanh C Tran
(74) *Attorney, Agent, or Firm*—Ware, Fressola, Van Der Sluys & Adolphson LLP

(57) ABSTRACT

The present invention provides a method for automatic calibration of a signal path in receivers (e.g., radio frequency receivers) using a noise (and not a specific test signal) as a source and a fast Fourier transform (FFT) of the noise for correcting various parameters related to an inphase/quadrature (I/Q) imbalance in a frequency domain. The present invention (method and apparatus) can provide detecting and correcting an I/Q phase error, an I/Q amplitude error, an absolute corner frequency of the analog baseband filter, and a relative corner frequency of the analog baseband filters just by using the noise as a stimuli. This calibration can be used for a factory calibration or it can be used as an on-site calibration for base stations. Mobile devices can calibrate themselves independently of their location. This reduces the requirements for the test equipment in the manufacturing and maintenance stages.

25 Claims, 5 Drawing Sheets

US 7,453,934 B2

AUTOMATIC RECEIVER CALIBRATION WITH NOISE AND FAST FOURIER TRANSFORM

TECHNICAL FIELD

This invention generally relates to receivers in communication systems, and more specifically to automatic calibration of a signal path in receivers (e.g., radio frequency receivers).

BACKGROUND ART

Receivers introduce different kind of non-idealities, which disturb the reception. These non-idealities are typically corrected with several different methods, which are digital or analogue or their mixture. Some of the methods use test signals to calibrate, some do not.

Receiving a multi-carrier signal, or a signal with high-order modulation, requires a high image rejection from an analog receiver. In the analog receiver, which is, for example, based on direct conversion or digital-IF (intermediate frequency) architectures, the image rejection is limited by the I/Q (inphase/quadrature) imbalance. The most important factors deteriorating the I/Q balance are a LO (local oscillator) phase error, i.e., deviation of the LO signals provided to the I- and Q-branch mixers from a perfect phase quadrature, a gain difference between components in the analog I- and Q-branches, and a difference in corner frequencies of low-pass filters in the I- and Q-branches resulting in frequency-dependent gain and phase imbalance.

Previously (per the prior art), the I/Q balance calibration typically needed specific test signals in order to perform the calibration. Also, analog baseband filter corner frequency calibration has been done by separate calibration methods, for example, based on an RC time constant measurement.

Another prior art approach to deal with the I/Q imbalance is to estimate the imbalance and then compensate it by digital processing. Various such compensation algorithms have been proposed. Of particular interest here is the algorithm described in the US Patent Application US 2004/00822300 "Digital Imbalance Correction Method and Device" by Hans-Otto Scheck. In that invention, an FFT (fast Fourier transform) is proposed to be used for estimating the gain imbalance by using a specific test signal (not a noise) as a stimuli.

The US Patent application US 2004/00822300 "Method and Apparatus Providing Calibration Technique for RF Performance Tuning" by Pauli Seppinen et al. describe receiver calibration methods, and in particular, in one of the embodiments the center frequency is calibrated by utilizing a noise to locate the right calibration word for LNA (low noise amplifier) center frequency tuning.

DISCLOSURE OF THE INVENTION

The object of the present invention is to provide a novel method for automatic calibration of a signal path in receivers (e.g., radio frequency receivers) using a noise as a source and a fast Fourier transform of the noise for correcting various parameters related to inphase/quadrature imbalance in a frequency domain.

According further to the first aspect of the invention, the method for an automatic calibration of a receiver, comprises the steps of: providing an input noise signal; generating at least one output inphase component and at least one corresponding output quadrature component of the input noise signal in inphase and quadrature branches, respectively, by the receiver using a pre-selected procedure; generating at least two fast Fourier transforms of the at least one output inphase component and at least one corresponding output quadrature component; and calibrating the receiver for eliminating imbalance between at least two parameters each corresponding to a unique one of the at least two fast Fourier transforms by comparing the at least two parameters based on a predetermined criterion, wherein the input noise signal does not require an electrical power to be provided to the receiver for generating the input noise source.

According further to the first aspect of the invention, the at least two parameters may describe a frequency dependent gain of the at least one output inphase component and of the at least one output quadrature component and the calibrating may comprise of adjusting the frequency dependent gain of the at least one output inphase component or the at least one corresponding output quadrature component in the receiver to eliminate a gain imbalance between the inphase and quadrature branches.

Further according to the first aspect of the invention, the at least two parameters may describe a frequency dependent phase of the at least one output inphase component and of the at least one output quadrature component and the calibrating may comprise of adjusting the frequency dependent phase of the at least one output inphase component or the at least one corresponding output quadrature component in the receiver to eliminate a phase imbalance between the inphase and quadrature branches.

Still further according to the first aspect of the invention, the at least two parameters may describe a corner frequency of the at least one output inphase component and of the at least one output quadrature component and the calibrating may comprise of adjusting the corner frequency of the at least one output inphase component or the at least one corresponding output quadrature component in the receiver to eliminate a gain imbalance between the inphase and quadrature branches. Further, the adjusting of the corner frequency may be provided by adjusting at least one analog low-pass filter in the inphase or in the quadrature branch.

According further to the first aspect of the invention, the input noise signal may be provided by a pre-selected resistive noise source with a known value of a thermal noise, and the method may further comprise the step of: calculating a receiver gain as a total measured noise minus the known value of the thermal noise and minus a noise figure of the receiver.

According still further to the first aspect of the invention, the receiver may be a part of a mobile terminal, mobile phone or a mobile communication device.

According further still to the first aspect of the invention, the receiver may be a radio frequency (RF) receiver.

According yet further still to the first aspect of the invention, the noise source may be a resistor providing the input noise signal in a form of a thermal noise.

According to a second aspect of the invention, a receiver which can be automatically calibrated comprises:

a noise source, for providing an input noise signal; a processor, for generating at least one output inphase component and at least one corresponding output quadrature component of the input noise signal in inphase and quadrature branches, respectively, using a pre-selected procedure; an FFT block, for generating at least two fast Fourier transforms of the at least one output inphase component and at least one corresponding output quadrature component; and a calibration logic block, for calibrating the receiver for eliminating imbalance between at least two parameters each corresponding to a unique one of the at least two fast Fourier transforms by comparing the at least two parameters based on a predetermined criterion, wherein the input noise signal does not require an electrical power to be provided to the receiver for generating the input noise source.

According further to the second aspect of the invention, the at least two parameters may describe a frequency dependent gain of the at least one output inphase component and of the at least one output quadrature component and the calibrating may comprise of adjusting the frequency dependent gain of the at least one output inphase component or the at least one corresponding output quadrature component in the receiver to eliminate a gain imbalance between the inphase and quadrature branches.

Further according to the second aspect of the invention, the at least two parameters may describe a corner frequency of the at least one output inphase component and of the at least one output quadrature component and the calibrating may comprise of adjusting the corner frequency of the at least one output inphase component or the at least one corresponding output quadrature component in the receiver to eliminate a gain imbalance between the inphase and quadrature branches. Further the receiver may comprise: at least one analog low-pass filter in the inphase or in the quadrature branch, for adjusting the corner frequency.

Still further according to the second aspect of the invention, the noise source may be a pre-selected resistive noise source with a known value of a thermal noise, and a receiver gain may be calculated as a total measured noise minus the known value of the thermal noise and minus a noise figure of the receiver. Further, the receiver gain or a receiver noise figure may be adjusted based on a predetermined specification by a calibration logic block.

According further to the second aspect of the invention, the the receiver may be a part of a mobile terminal, mobile phone or a mobile communication device.

According still further to the second aspect of the invention, the receiver may be a radio frequency (RF) receiver.

According further still to the second aspect of the invention, the noise source may be a resistor providing the input noise signal in a form of a thermal noise generated by an electric current.

According to a third aspect of the invention a communication device, comprises: a receiver which can be automatically calibrated without generating a specific test signal, the receiver containing: a noise source, for providing an input noise signal; a processor, for generating at least one output inphase component and at least one corresponding output quadrature component of the input noise signal in inphase and quadrature branches, respectively, using a pre-selected procedure; an FFT block, for generating at least two fast Fourier transforms of the at least one output inphase component and at least one corresponding output quadrature component; and a calibration logic block, for calibrating the receiver for eliminating imbalance between at least two parameters each corresponding to a unique one of the at least two fast Fourier transforms by comparing the at least two parameters based on a predetermined criterion, wherein the input noise signal does not require an electrical power to be provided to the receiver for generating the input noise source.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

Figure 1:
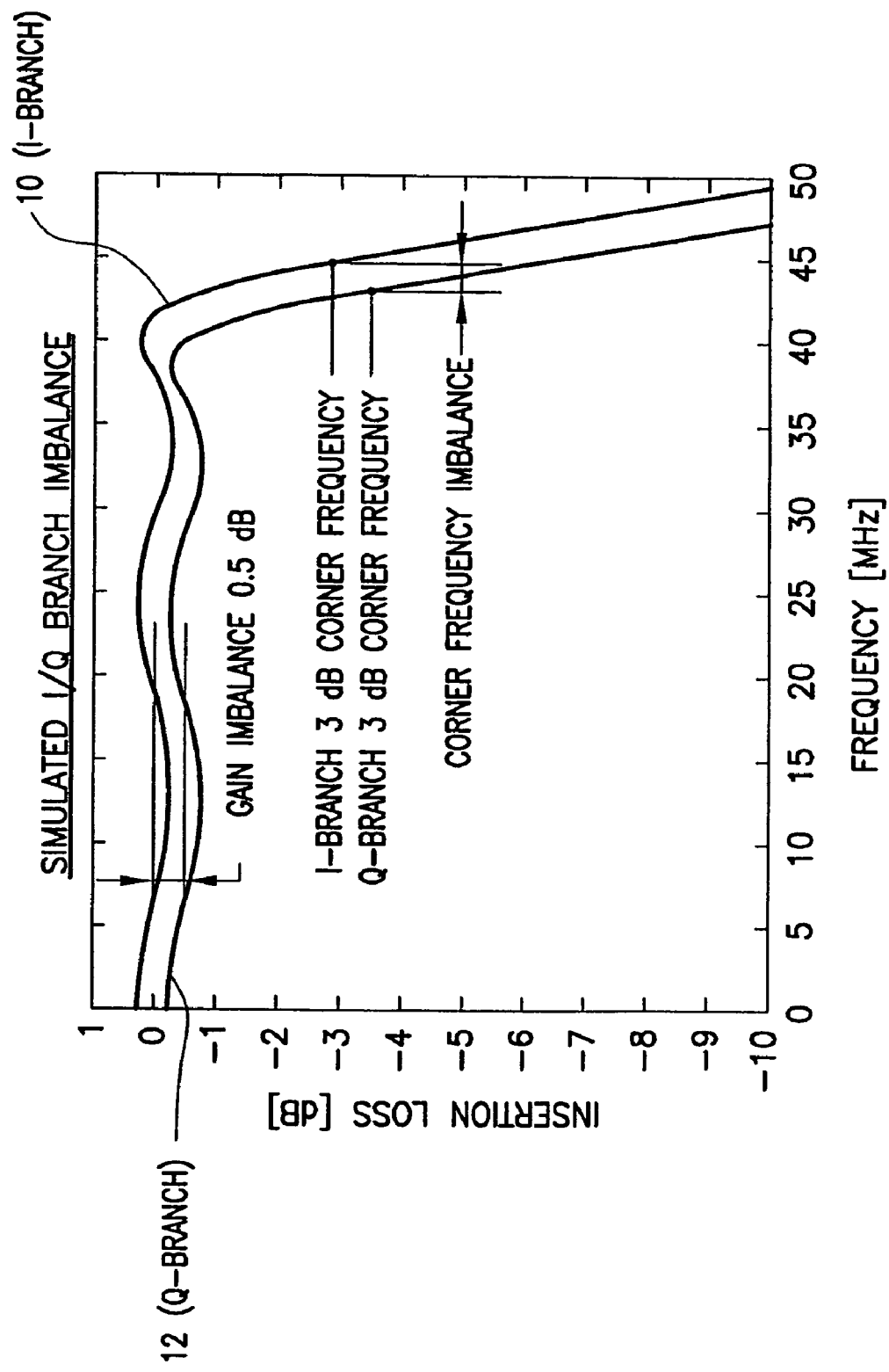
FIG. 1 is a simulated graph demonstrating a frequency-dependent gain imbalance in inphase and quadrature branches, respectively.

The object of the present invention is to provide a novel method for automatic calibration of a signal path in receivers (e.g., radio frequency receivers) using a noise (and not a specific test signal) as a source and a fast Fourier transform (FFT) of the noise for correcting various parameters related to an inphase/quadrature (I/Q) imbalance in a frequency domain.

The present invention (method and apparatus) can provide detecting and correcting an I/Q phase error, an I/Q amplitude error, an absolute corner frequency of the analog baseband filter, and a relative corner frequency of the analog baseband filters just by using the noise as a stimuli. This calibration can be used for a factory calibration or it can be used as an on-site calibration for base stations. Moreover, mobile devices can calibrate themselves independently of their location. This reduces the requirements for the test equipment in the manufacturing and maintenance stages.

As stated above, the method of the present invention is based on the FFT and measuring noise. Generally, receivers receive some noise coming from the radio channel and the receiver itself. Although the noise power is usually undesired, it can be used constructively to calibrate various non-idealities in the receiver. The main goal of the present invention is to extend the use of the noise as the stimulus to calibrate the analog baseband filter corner frequency and the IQ phase and amplitude in the receiver. In addition to these goals, the noise can be used to estimate the receiver gain. This can be done since the received noise is the sum of a well-known thermal noise (−174 dBm/Hz from 50 ohm) and a noise figure. Since the noise figure is not changing more than a couple of dB in process variations, the gain can be estimated within this accuracy. It is also possible to estimate the noise figure with some known methods and with an integrated switched noise source. This increases the accuracy of the gain measurement. Main target application of the method of the present invention is integrating it to a mobile device, which can use the calibration procedure described in the present invention during the production testing if necessary. The benefit is really that the RF receiver can be measured and calibrated without extra signal sources. This is the main difference of the present invention compared to existing prior art methods.

According to an embodiment of the present invention, there are few alternatives for providing a noise source. First, the noise source can be a known passive termination (e.g., 50 ohm or others) providing thermal white noise. This source of noise does not need an electrical current, and it is different from an active noise source driving the electric current which makes difficult to integrate such an active noise source in a mobile terminal. Another method to get a known noise source in the receiver input is to measure the radio channel noise. Since various transmitted signals in the radio channel increase the noise power, using empty guardbands which are, for example, located around dedicated system radio frequencies (e.g., WCDMA frequencies) for the measurement can provide a noise power without other signals. A further method for providing a noise source in a multiband and multimode transceiver is to utilize the large amount of radio band switches, radio bandpass filters, diplexers and duplexers to get a configuration where a noise power from a terminal internal termination (impedance) can be measured.

The key ingredients of the invention include using RF noise for calibration and using FFT for analyzing the received calibration noise signal in a frequency domain. The first feature is very advantageous in that no extra stimulus is needed: noise, which is usually thought as an unavoidable and harmful error source, is used as means for calibrating the device. A sufficient requirement for applying the present invention is that the noise power generated in a radio channel and RF components dominates over the noise power generated in analog baseband components and the quantization noise from AD (analog-digital) converters. Therefore the calibration described in the present invention is possible at sufficiently high gain settings, such that AD quantization noise does not exceed the RF noise.

Moreover, since the FFT is required, the best advantage of the present invention is realized in OFDM (orthogonal frequency domain multiple access)-based systems, where the FFT is used to modulate and demodulate the signals and, hence, no extra resources are required for providing the FFT. Examples of such systems are WLAN (wireless local area network) and DVB (digital video broadcast), and OFDM is commonly considered as the most likely candidate for the coming UWB (Ultra Wide Band) and other future mobile broadband systems, e.g., 4G systems. For systems, where the FFT is not "naturally" used, the FFT can be added at the cost of increased complexity (e.g., increased number of gates in the digital side). However, RC time constant calibration and I/Q imbalance calibration are both consuming IC area as well.

According to the present invention, the existing digital and analog methods for estimating and compensating, e.g., LO (local oscillator) phase error and DC offsets, can be combined with the method described by the present invention. Furthermore, the prior art methods utilizing, e.g., the I/Q compensation entirely in digital domain can achieve very high image rejection, but they require high AD resolution, large internal bitwidth, and more digital signal processing. These factors shall be preferably avoided in mobile terminals where low cost and low power consumption of utmost importance and wherein the method described by the present invention can be utilized as a viable alternative.

FIGS. 1 through 5 demonstrate different implementation aspects of the present invention and are described below in detail.

FIG. 1 is a simulated graph demonstrating a frequency-dependent gain imbalance in inphase 10 and quadrature 12 branches, respectively. The receiver has a direct conversion architecture with nominal 41.6 MHz baseband bandwidth. There is 0.5 dB mean gain imbalance between the I- and Q-branches, assumed to be generated by corresponding mixers (e.g., 32a and 32b in FIG. 3 discussed below). The I- and Q-branch low-pass filters (e.g., 35a and 35b in FIG. 3) both have 0.5 dB ripple and about 4% difference between their corner frequencies.

Figure 2:
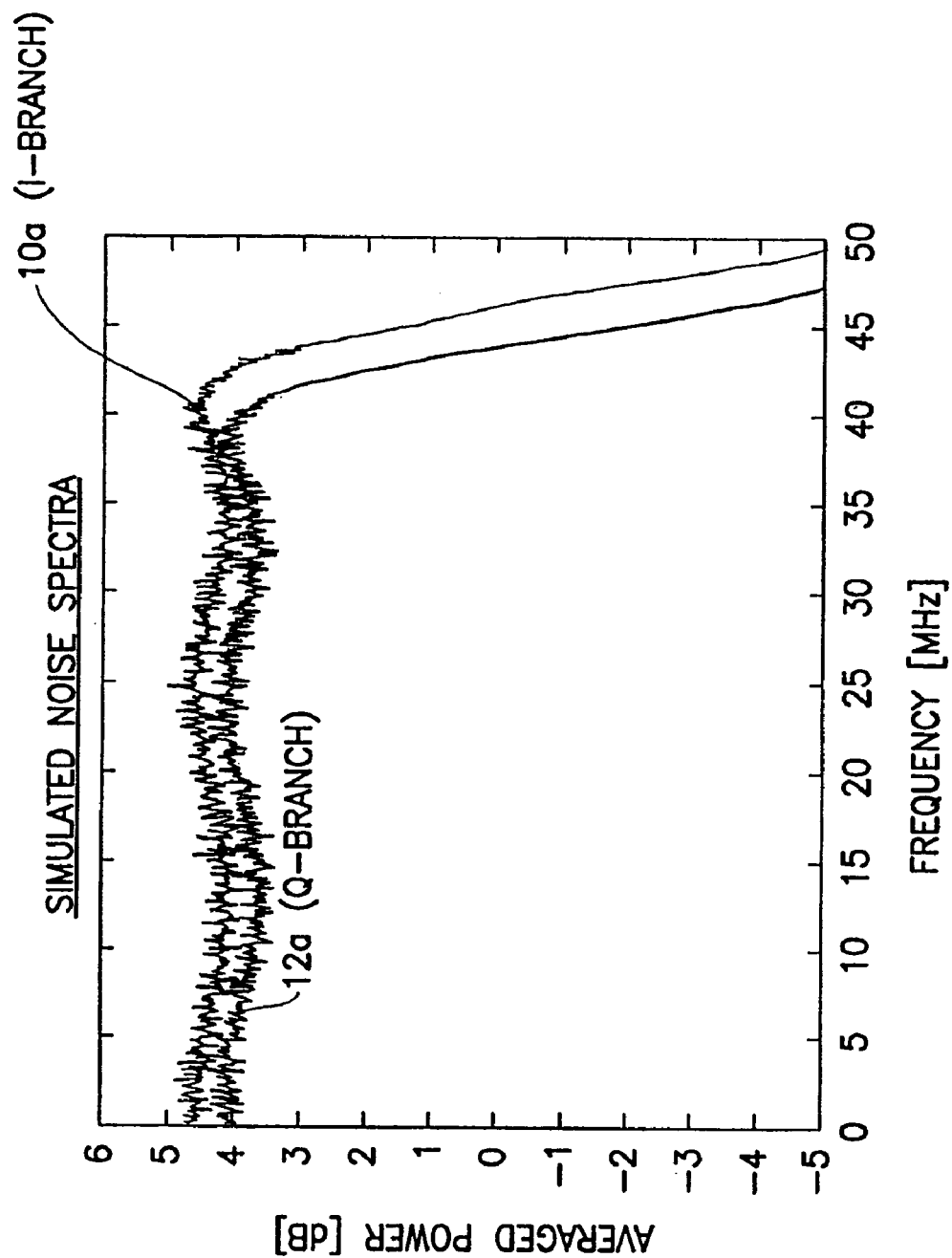
FIG. 2 is a simulated graph demonstrating inphase and quadrature fast Fourier transform (FFT) power spectra for an input noise signal arising due to a thermal noise in a radio channel and RF (radio frequency) components.

FIG. 2 is a simulated graph demonstrating inphase 10a and quadrature 12a fast Fourier transform (FFT) power spectra for an input noise signal arising due to a thermal noise in a radio channel and RF (radio frequency) components. AD (analog-to-digital) converters (e.g., 38a and 38b in FIG. 3) run at a sampling rate 204.8 MHz. The receiver gain is assumed high enough, such that a root-mean-squared AD output signal corresponds to about 3 bits. The FFT size used is 2048 and averaging was taken over 1000 FFT's, corresponding to an effective averaging time of about 20 ms. The obtained spectra are seen to match with those of FIG. 1.

Figure 3:
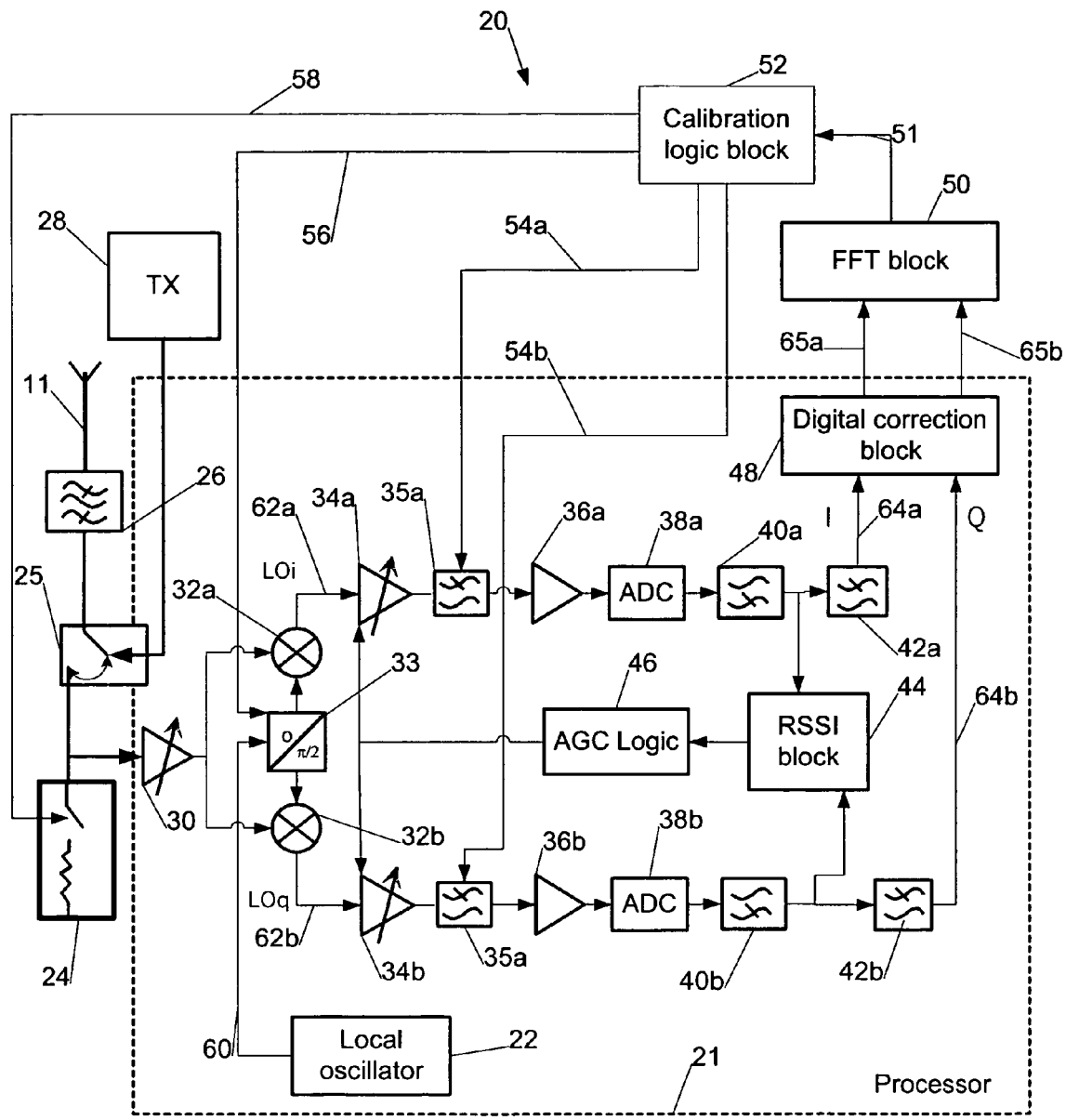
FIG. 3 is a block diagram of a receiver, according to the present invention.

FIG. 3 shows one example among others of a block diagram of a receiver 20, according to the present invention. In the example of FIG. 3 a direct conversion receiver is used but other types of receiver architectures can be used, according to the present invention. All of the measurements and calibrations are performed using a noise source 24, e.g., the noise source 24 is a known resistor providing the input noise signal in a form of a thermal noise generated and used as a stimuli.

The signal processing provided by a processor 21 is conventional. After reception by an antenna 11 the desired band (e.g., WCDMA/GSM/or others) is selected using a bandpass filter 26 and passed through a first (variable) amplifying stage 25. The signal is then deconverted with mixers 32a and 32b, respectively, to an intermediate frequency (IF) (i.e., a direct conversion) using signals (in anti-phase, 90° apart) from a quadrature local oscillator (LO) 33 to generate inphase 62a and quadrature 62b signal components, respectively. Then the signals 62a and 62b are amplified by amplifiers 34a and 34b and then processed by analog low-pass filters 35a and 35b, respectively. The filters 35a and 35b suffer from analog imperfections, which this invention provides a calibration for and are of main interest according to the present invention. After the down conversion, the signals are applied to baseband amplifiers 36a and 36b, then to analog-to-digital converters 38a and 38b and subsequently to digital filters 40a and 40b followed by further digital filters 42a and 42b, respectively. Blocks 44 (received signal strength indicator block) and 46 (AGC logic) provide a conventional feedback for an automatic gain control of the amplifiers 34a and 34b. The filters 40a, 40b, 42a and 42b are digital filters with no analog imperfections. The output signals 64a and 64b of the corresponding digital filters 42a and 42b are going through a digital correction block 48 and providing input signals 65a and 65b (in the inphase and quadrature branches, respectively) to an FFT block 50. It is noted that the digital correction using the block 48 can occur before or after the FFT block 50. The FFT block performs the fast Fourier transform (FFT) of the input signals 65a and 65b (more details are provided below) and provides the transform signals 51 to a calibration logic block 52. The calibration logic block 52 performs the appropriate calibration for eliminating imbalance between the inphase and quadrature branches described above, e.g. adjusting a corner frequency of one (or both) of the filters 35a and/or 35b or adjusting (not shown in FIG. 3) amplifier's (e.g., 34a, 34b, 36a or 36b) gain base on a predetermined criterion (e.g., tolerating a certain maximum error). The calibration logic block 52 activates the noise source 24 to perform the calibration (the noise source, according to an embodiment of the present invention, as described above). A switch 25, also shown in FIG. 3b, is for switching between a transmission mode (signal is transmitted by the transmitter 28) and a receiving mode.

The present invention, as stated above, uses the noise power and the FFT to calibrate, e.g., the analog I/Q gain imbalance and the low-pass filter corner frequencies. Some details are provided below for implementing the present invention. Consider an RF or IF noise signal of the form $$s_{RF}(t)=n_I(t)\cos(2\pi f_{LO}t)-n_Q(t)\sin(2\pi f_{LO}t) \qquad (1).$$

Here in Equation 1, $n_I(t)$ and $n_Q(t)$ are baseband-equivalent noise signals, and $f_{LO}$ denotes a carrier frequency coinciding with the frequency of the local oscillator (LO) of the receiver. In IQ downconversion, the above RF signal is mixed with I- and Q-branch local oscillator signals, which are approximate in 90-degree phase quadrature. Subsequent low-pass filters remove the harmonics resulting from the mixing operation and limit the bandwidth of the signal. However, because of analog imperfections, the phase difference of the LO signals is not exactly 90 degrees, the I- and Q-branch mixers (e.g., the mixers 32a and 32b) have slightly different gain, and the low-pass filters have slightly differing corner frequencies; see FIG. 1. The resulting baseband I- and Q-branch signals $i(t)$ and $q(t)$ can be taken to be of the form $$i(t)=g_I L_I\{(n_I(t)\}+n_{I,BB}(t) \quad (2),$$

$$q(t)=g_Q L_Q\{\sin(\phi)n_I(t)+\cos(\phi) n_Q(t)\}+n_{Q,BB}(t) \quad (3).$$

Here (in Equations 2 and 3), $g_I$ and $g_Q$ denote the gains of the I- and Q-branch mixers (e.g., the mixers 32a and 32b), $\phi$ is a LO phase error, the operators $L_I\{\ \}$ and $L_Q\{\ \}$ denote low-pass filtering (e.g., using filters 35a and 35b), and $n_{I,BB}(t)$ and $n_{Q,BB}(t)$ are noise signals generated at the baseband. For the sake of clarity, ignore the remaining signal processing such as baseband amplification, AD conversion, and DC-offset compensation, and consider next that the above baseband signals are separately Fourier-transformed in the digital domain (technically, the operation can be carried out with a single, complex-valued FFT, and some index manipulation). As a result, two Fourier-domain signals, $I(f)$ and $Q(f)$, are obtained (e.g., by the FFT block 50) and given by:

$$I(f)=g_I H_I(f) N_I(f)+N_{I,BB}(f) \quad (4),$$

$$Q(f)=g_Q H_Q(f)(\sin(\phi)N_I(f)+\cos(\phi)N_Q(f))+N_{Q,BB}(f) \quad (5).$$

Here (in Equations 4 and 5), $H_Q(f)$ and $H_Q(f)$ denote the frequency-responses of the analog I- and Q-branch low-pass filters (e.g., filters 35a and 35b, respectively) and, within the frequency band of interest, the noise spectra can be assumed flat, uncorrelated, and corresponding to additive white Gaussian noise. Consequently, $$E\{|I(f)|^2\}=g_I^2|H_I(f)|^2|N_I|^2+|N_{I,BB}|^2=g_I^2|H_I(f)|^2 P_{noise,RF}+P_{noise,BB}, \quad (6)$$

$$E\{|Q(f)|^2\}=g_Q^2|H_Q(f)|^2(\sin^2(\phi)|N_I|^2+\cos^2(\phi)|N_Q|^2)+|N_{I,BB}|^2=g_I^2|H_Q(f)|^2 P_{noise,RF}+P_{noise,BB}. \quad (7)$$

Here (in Equations 6 and 7), operator $E\{\ \}$ corresponds to taking the expectation value, variable $P_{noise,RF}$ stands for the spectral density of the I- and Q-branch RF noise and, similarly, $P_{noise,BB}$ is an equivalent for a noise generated at the baseband. A practical method for estimating an expectation value is to average over several (many) samples, in this case over several Fourier transforms. Hence, we can conclude that the I- and Q-branch filter corner frequencies and the gain imbalance between the branches can be determined by Fourier-transforming the thermal noise generated in radio channel and at the RF components of the receiver 21 and the appropriate calibration can be performed using calibration logic block 52, as described herein.

Figure 4:
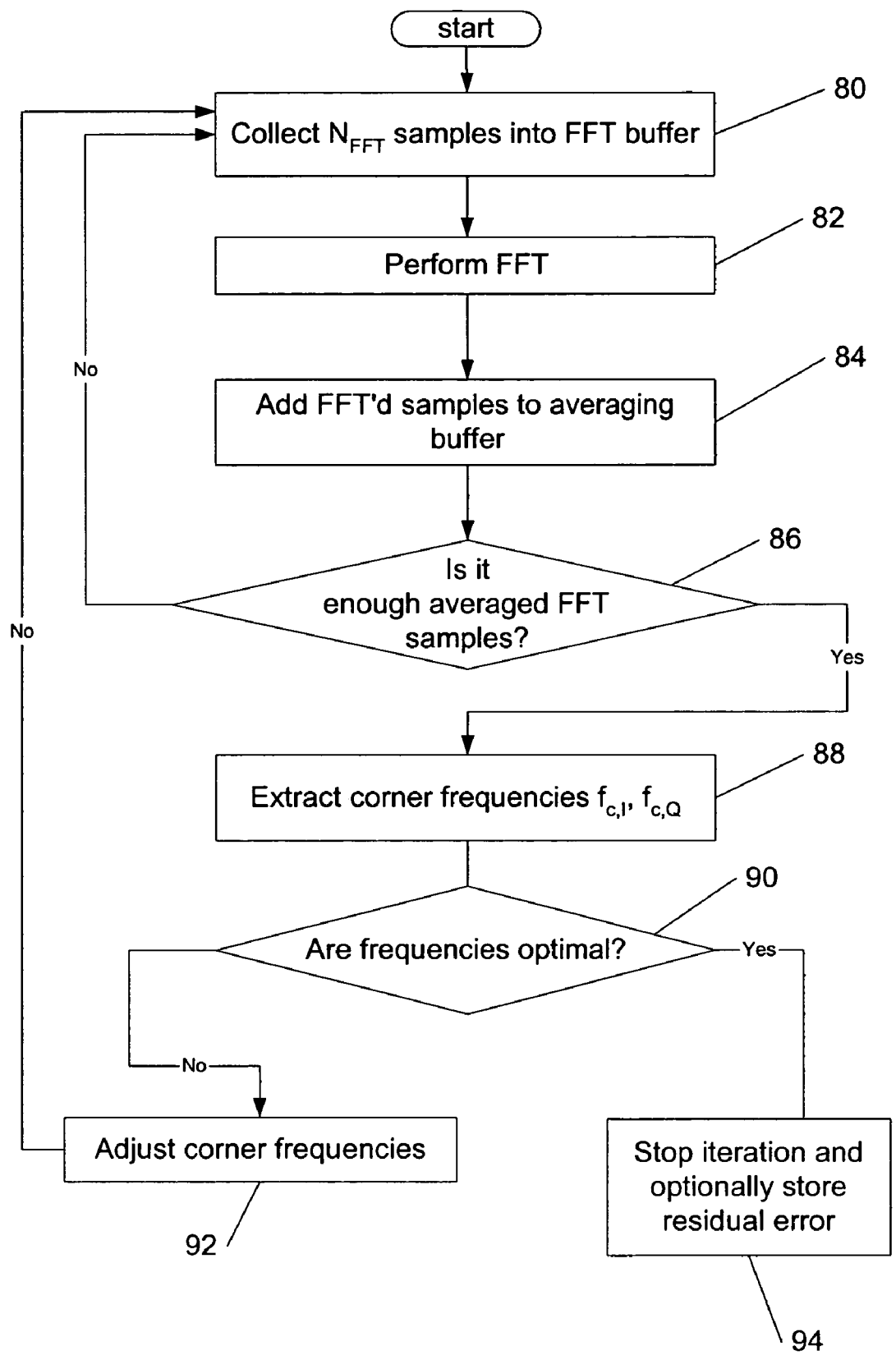
FIG. 4 is a flow chart demonstrating calibration of low-pass filter corner frequencies, according to the present invention.

FIG. 4 shows an example of a flow chart demonstrating calibration of low-pass filter corner frequencies, according to the present invention.

The flow chart of FIG. 4 represents only one possible scenario among many others. In a method according to the present invention, in a first step 80, $N_{FFT}$ samples are collected into an FFT buffer of the FFT block 50 (it is assumed that initially the tunable corner frequencies are set to some initial value). In a next step 82, the FFT is performed on the $N_{FFT}$ samples. In a next step 84, the FFT's samples are added to an averaging buffer of the FFT block 50.

In a next step 86, it is ascertained whether it is enough averaged FFT samples. As long as that is not the case, the process goes back to step 80. However, if it is determined that it is enough averaged FFT samples, in a next step 88, the corner frequencies $f_{c,I}$ and $f_{c,Q}$ of the inphase and quadrature branches, respectively, are determined from the averaged FFT samples using the calibration logic block 52

In a next step 90, it is ascertained by the calibration logic block 52 whether the corner frequencies $f_{c,I}$ and $f_{c,Q}$ are optimal according to a predetermined criterion. As long as that is not the case, in a next step 92 the calibration logic block 52 adjusts corner frequencies (e.g., by tuning filters 35a and/or 35b) and then the process goes back to step 80 and the procedure is repeated again. However, if it is determined that the corner frequencies $f_{c,I}$ and $f_{c,Q}$ are optimal, in a next step 94, the iteration procedure is stopped and a residual error of a corner frequency difference is optionally stored.

Figure 5:
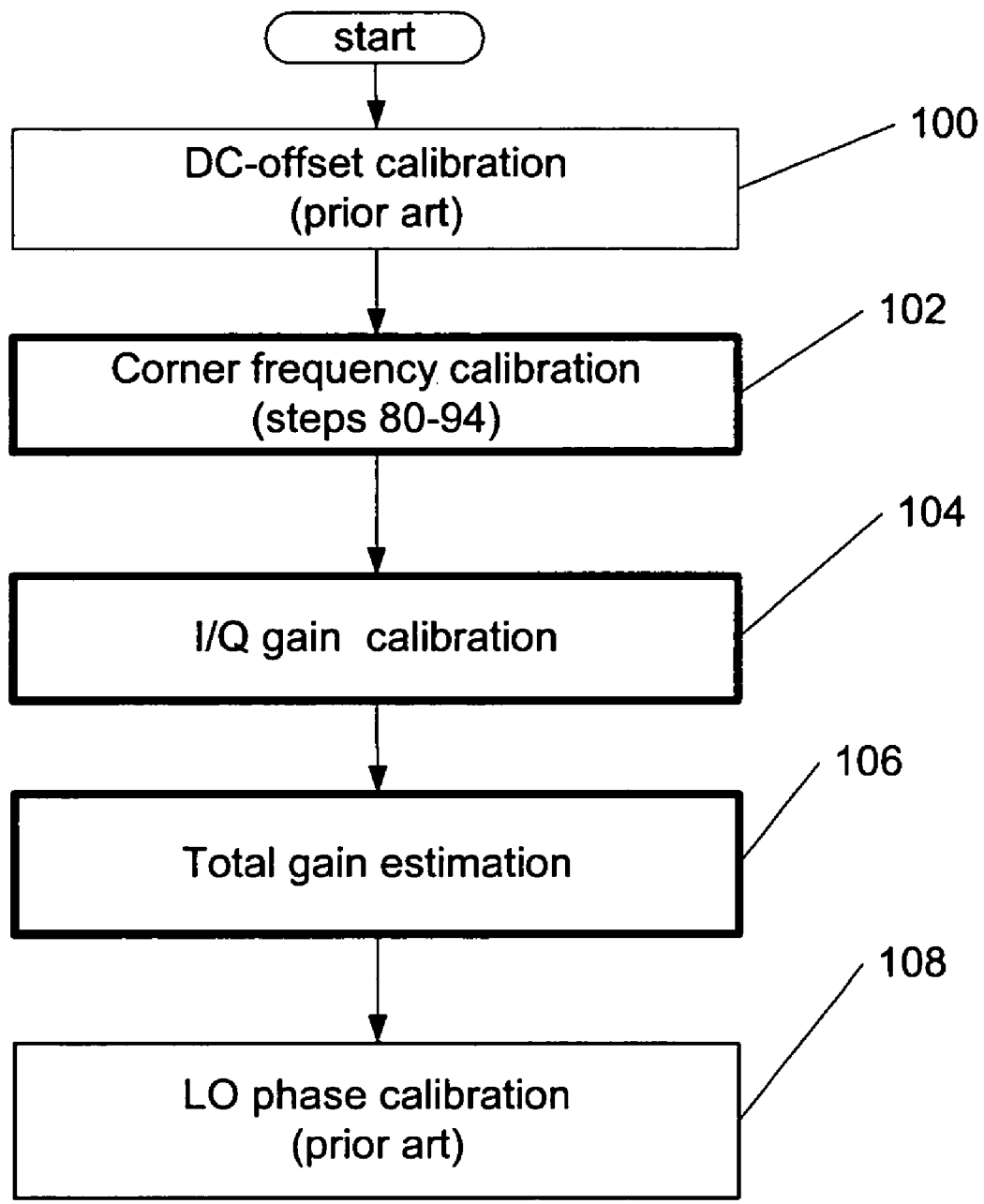
FIG. 5 is a flow chart demonstrating a top-level calibration procedure, according to the present invention.

FIG. 5 shows a flow chart demonstrating a top-level calibration procedure, according to the present invention.

The flow chart of FIG. 5 represents only one possible scenario among many others. In a method according to the present invention, in a first step 100, a DC-offset is calibrated to extend a dynamic range and the remaining offset is removed from the signal following a well-known prior art procedure. In a next step 102, the corner frequency calibration is performed according to the procedure of FIG. 4 (steps 80-94). In a next step 104, calibration of gain imbalance according to the present invention proceeds in a similar fashion. In a next step 106, a total gain estimation is performed: according to the present invention, the input noise signal is provided by a pre-selected resistive noise source 24 with a known value of a thermal noise, and then the receiver 21 gain can be calculated as a total measured noise minus said known value of the thermal noise and minus a noise figure of the receiver 21. Then the receiver gain and/or noise figure can be adjusted based on a predetermined specification using, e.g., the calibration logic block 52. In some implementations receiver gain and noise figure can be controlled separately. In a step 108, a phase imbalance caused by the LO quadrature phase generation (per individual channels) is adjusted using prior art techniques.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:
  generating at least one output inphase component and at least one corresponding output quadrature component of an input noise signal to a receiver in inphase and quadrature branches, respectively, by said receiver using a pre-selected procedure;
  generating at least two fast Fourier transforms of said at least one output inphase component and at least one corresponding output quadrature component; and
  calibrating said receiver for eliminating a frequency dependent imbalance between at least two parameters each corresponding to a unique one of said at least two fast Fourier transforms by comparing said at least two parameters using a predetermined criterion, wherein a noise source does not require an electrical power to be provided by said receiver for generating said input noise signal.

2. The method of claim 1, wherein said at least two parameters describe a frequency dependent gain of said at least one output inphase component and said at least one output quadrature component and said calibrating comprises of adjusting said frequency dependent gain of said at least one output inphase component or said at least one corresponding output quadrature component in said receiver to eliminate a gain imbalance between said inphase and quadrature branches.

3. The method of claim 1, wherein said at least two parameters describe a frequency dependent phase of said at least one output inphase component and said at least one output quadrature component and said calibrating comprises of adjusting said frequency dependent phase of said at least one output inphase component or said at least one corresponding output quadrature component in said receiver to eliminate a phase imbalance between said inphase and quadrature branches.

4. The method of claim 1, wherein said at least two parameters describe a corner frequency of said at least one output inphase component and said at least one output quadrature component and said calibrating comprises of adjusting said corner frequency of said at least one output inphase component or said at least one corresponding output quadrature component in said receiver to eliminate a gain imbalance between said inphase and quadrature branches.

5. The method of claim 4, wherein said adjusting of said corner frequency is provided by adjusting at least one analog low-pass filter in said inphase or in said quadrature branch.

6. The method of claim 1, wherein said input noise signal is provided by a pre-selected resistive noise source with a known value of a thermal noise, and the method further comprises:
calculating a receiver gain as a total measured noise minus said known value of the thermal noise and minus a noise figure of the receiver.

7. The method of claim 1, wherein said receiver is a part of a mobile terminal, mobile phone or a mobile communication device.

8. The method of claim 1, wherein said receiver is a radio frequency receiver.

9. The method of claim 1, wherein said noise source is a resistor providing said input noise signal in a form of a thermal noise.

10. An apparatus, comprising:
a processor, configured to generate at least one output inphase component and at least one corresponding output quadrature component of an input noise signal in inphase and quadrature branches, respectively, using a pre-selected procedure;
an FFT block, configured to generate at least two fast Fourier transforms of said at least one output inphase component and at least one corresponding output quadrature component; and
a calibration logic block, configured to calibrate said apparatus for eliminating a frequency dependent imbalance between at least two parameters each corresponding to a unique one of said at least two fast Fourier transforms by comparing said at least two parameters using a predetermined criterion,
wherein a noise source does not require an electrical power to be provided by said apparatus for generating said input noise signal.

11. The apparatus of claim 10, wherein said at least two parameters describe a frequency dependent gain of said at least one output inphase component and said at least one output quadrature component and said calibrating comprises of adjusting said frequency dependent gain of said at least one output inphase component or said at least one corresponding output quadrature component in said apparatus to eliminate a gain imbalance between said inphase and quadrature branches.

12. The apparatus of claim 10, wherein said at least two parameters describe a corner frequency of said at least one output inphase component and said at least one output quadrature component and said calibrating comprises of adjusting said corner frequency of said at least one output inphase component or said at least one corresponding output quadrature component in said apparatus to eliminate a gain imbalance between said inphase and quadrature branches.

13. The apparatus of claim 12, further comprising:
at least one analog low-pass filter in said inphase or in said quadrature branch,
configuring to adjust said corner frequency.

14. The apparatus of claim 10, wherein said noise source is a pre-selected resistive noise source with a known value of a thermal noise, and an apparatus gain equals a total measured noise minus said known value of the thermal noise and minus a noise figure of the apparatus.

15. The apparatus of claim 14, wherein said calibration logic block is adopted to adjust said apparatus gain or an noise figure using a predetermined specification by a calibration logic block.

16. The apparatus of claim 10, wherein said apparatus is a part of a mobile terminal, mobile phone or a mobile communication device.

17. The apparatus of claim 10, wherein said apparatus is a receiver or a radio frequency receiver.

18. The apparatus of claim 10, wherein said noise source is a resistor providing said input noise signal in a form of a thermal noise generated by an electric current.

19. The apparatus of claim 10, wherein said noise source is a part of said apparatus.

20. A device, comprising:
an apparatus configured to be automatically calibrated without generating a specific test signal, said apparatus comprises:
a processor, configured to generate at least one output inphase component and at least one corresponding output quadrature component of an input noise signal in inphase and quadrature branches, respectively, using a pre-selected procedure;
an FFT block, configured to generate at least two fast Fourier transforms of said at least one output inphase component and at least one corresponding output quadrature component; and
a calibration logic block, configured to calibrate said apparatus for eliminating a frequency dependent imbalance between at least two parameters each corresponding to a unique one of said at least two fast Fourier transforms by comparing said at least two parameters using a predetermined criterion,
wherein a noise source does not require an electrical power to be provided by said apparatus for generating said input noise signal.

21. The device of claim 20, wherein said apparatus is a receiver or a radio frequency receiver.

22. The device of claim 20, wherein said device is a communication device, a mobile terminal, a mobile phone or a mobile communication device.

23. The apparatus of claim 20, wherein said noise source is a part of said device.

24. An apparatus, comprising:

means for generating at least one output inphase component and at least one corresponding output quadrature component of in input noise signal in inphase and quadrature branches, respectively, by said apparatus using a pre-selected procedure;

means for generating at least two fast Fourier transforms of said at least one output inphase component and at least one corresponding output quadrature component; and means for calibrating said apparatus for eliminating a frequency dependent imbalance between at least two parameters each corresponding to a unique one of said at least two fast Fourier transforms by comparing said at least two parameters using a predetermined criterion, wherein a noise source does not require an electrical power to be provided by said apparatus for generating said input noise signal.

25. The apparatus of claim 24, wherein said apparatus is a receiver or a radio frequency receiver.

* * * * *

UNITED STATES PATENT AND TRADEMARK OFFICE
CERTIFICATE OF CORRECTION

| | | |
|---|---|---|
| PATENT NO. | : 7,453,934 B2 | Page 1 of 1 |
| APPLICATION NO. | : 11/169284 | |
| DATED | : November 18, 2008 | |
| INVENTOR(S) | : Pauli Seppinen, Julius Koskela and Mikael Gustafsson | |

It is certified that error appears in the above-identified patent and that said Letters Patent is hereby corrected as shown below:

In column 10, line 28, which is claim 15, line 2, delete "an" and -- an apparatus -- should be inserted.

Signed and Sealed this

Twenty-fourth Day of February, 2009

JOHN DOLL
*Acting Director of the United States Patent and Trademark Office*